United States Patent [19]

Fisher

[11] Patent Number: 5,190,998

[45] Date of Patent: Mar. 2, 1993

[54] BITUMEN BLENDS

[75] Inventor: Robert G. Fisher, Kent, England

[73] Assignee: The British Petroleum Company p.l.c., London, United Kingdom

[21] Appl. No.: 717,554

[22] Filed: Jun. 19, 1991

[30] Foreign Application Priority Data

Jun. 22, 1990 [GB] United Kingdom ............... 9013951

[51] Int. Cl.$^5$ .............................................. C08L 95/00
[52] U.S. Cl. ...................................... 524/59; 524/69; 524/70; 524/71
[58] Field of Search .................. 524/59, 71, 69, 70

[56] References Cited

U.S. PATENT DOCUMENTS

| 4,272,582 | 6/1981 | Kumins et al. | 524/59 |
| 4,278,469 | 7/1981 | Yan et al. | 524/71 |
| 4,530,652 | 7/1985 | Buck et al. | 428/291 |
| 4,818,367 | 4/1989 | Winkler | 524/69 |

FOREIGN PATENT DOCUMENTS

| 1470744 | 10/1963 | Fed. Rep. of Germany . | |
| 0044137 | 4/1976 | Japan | 524/59 |

*Primary Examiner*—Paul R. Michl
*Assistant Examiner*—Peter Szekely
*Attorney, Agent, or Firm*—D. J. Untener; L. W. Evans

[57] ABSTRACT

Paving composition comprising a blend of specified bitumen and high vinyl butadiene, substantially free of added sulphur or peroxide, with elastic recovery greater than 50%.

12 Claims, 1 Drawing Sheet

BITUMEN BLENDS

The present invention relates to polymer/bitumen blends, in particular it relates to polymer bitumen blends suitable for paving, i.e. road use.

It is known to prepare blends containing a major proportion of bitumen and a minor amount of polymer. Various polymers have been proposed for this purpose, including homopolymers and copolymers of butadiene. Polybutadiene can be polymerised so that the butadiene molecules mainly link up head-to-tail to give polymers containing high proportions of cis or trans isomers (high trans polybutadiene and high cis polybutadiene). Polybutadiene can also be polymerised to give a polymer with a high proportion of vinyl groups which are pendant from the main polymer chain (high vinyl polybutadiene). High cis and high trans polymers are more widely available than high vinyl polymers.

In general it is desirable to cross-link the polymer in the bitumen/polymer blend in order to obtain improved physical properties. This cross-linking step is carried out by mixing the bitumen with polymer which has not been cross-linked and with a cross-linking agent such as a sulphur compound or a peroxide. The use of peroxide and sulphur cross-linking agents is now considered to be undesirable on environmental grounds.

There is a need to provide bitumen based paving compositions which have good physical properties but which do not use undesirable added sulphur or peroxide curing agents.

According to the present invention a paving composition comprises a blend of bitumen having the following characteristics:
- a penetration in the range 15–450 mm/10,
- a softening point in the range 30° to 80° C., and
- a penetration index of −2 to +2 and
- a high vinyl polybutadiene containing not more than 50% by weight of units derived from a comonomer, the quantity of polymer being in the range 0.5 to 20% by weight of the total blend, said blend being substantially free of added sulphur or peroxide cross-linking agents, and having an elastic recovery of over 50%.

According to the present invention the process for making paving bitumen blend comprises:
(a) melting bitumen having the following characteristics:
- a penetration in the range 15–450 mm/10,
- a softening point in the range 30° to 80° C., and
- a penetration index of −2 to +2
(b) adding to the molten bitumen a quantity of a high vinyl polybutadiene, which polybutadiene contains not more than 50% by weight of units derived from a comonomer, in an amount in the range 0.5 to 20% based on weight of blend to give a mixture substantially free of added sulphur and peroxide curing agent,
(c) subjecting the mixture of bitumen and polymer to sufficient agitation at a temperature in the range 160°–180° C. to disperse the polymer in the blend,
(d) curing the polymer by the steps of agitating the molten mixture in the presence of air at a temperature in excess of 190° C. for a time sufficient to give an elastic recovery of over 50%.

The penetration as quoted in this specification is determined in accordance with BS 4691, the softening point is determined in accordance with BS 4692, and the elastic recovery (ductility) is determined in accordance with a modification of ASTMS D113, set out in more detail below.

Preferred bitumens for use in the invention are those having a penetration in the range 35–300 mm/10, and a softening point in the range 30°–65° C.

The polybutadiene used in the present invention is a high vinyl polybutadiene.

By "high vinyl polybutadiene" we mean a polymer with a content of 1,2-polybutadiene of at least 10%, more preferably at least 50% by weight.

The 1,2-polybutadiene content may be determined by $C^{13}$ NMR.

Liquid polybutadienes will have lower molecular weights, and it will therefore be necessary to use greater amounts and/or higher degrees of cross-linking. The polybutadiene is therefore preferably a solid polybutadiene at ambient temperature (20° C.). Preferably it has a weight molecular weight of at least 100 000. The only upper limit on the molecular weight is that it should not be so high that the ability of the polymer to disperse in the bitumen is adversely affected.

The polymer and the bitumen are blended together by adding the polymer, preferably divided into relatively small pieces, to molten bitumen. The temperature of the bitumen is sufficient to dissolve or disperse the polymer, but not so high as to produce cross-linking of the polymer, which would interfere with the blending of the polymer with the bitumen, or hardening of the bitumen by reaction with air, which would change the characteristics of the bitumen. Examples of suitable temperatures are those in the range 160°–180° C. The mixing is preferably carried out using a high shear mixer for times in the range 1 to 4 hours.

The air curing step may be carried out by heating the blend of bitumen and polymer in an open vessel. Preferably the mixture is subjected to gentle mechanical agitation to prevent skinning. Alternatively air may be blown through the bitumen/polymer blend at a controlled rate.

The temperature used is higher than that used for the blending step. The temperature is preferably in excess of 200° C., e.g. 205° C., but temperatures which are sufficiently high to cause hardening or decomposition of the bitumen are to be avoided. Thus it is preferred to avoid temperatures in excess of 220° C.

The duration of the air curing step will depend on the temperature and the degree of cure required but may for example be in the range 0.75 to 2 hours.

The invention will now be described with reference to the drawings in which.

EXAMPLE 1

A blend of polybutadiene and bitumen containing 1.5% by weight of polymer based on weight of polymer and bitumen was prepared as follows.

The bitumen was a bitumen having a penetration of 85 as determined by UK standard test IP 49 or BS 4691.

The polybutadiene was a high vinyl polybutadiene having a weight average molecular weight of about 200 000 and containing about 70% by weight of 1,2- polybutadiene, commercially available under the trade name "Intolene 80". Bitumen (85 Pen) was pre-heated to about 160° C. in an oven. A known weight of bitumen was transferred to a glass beaker. The beaker was placed on a hot plate and the temperature kept at 160°-170° C. by varying the energy input. A high shear mixer (Silverson mixer) was lowered into the bitumen and the bitumen stirred at high speed. Sufficient polymer to give 1.5% by weight of polymer in the total blend was cut into small pieces which were approximately 3 mm cubes. The cubes were added to the stirred bitumen over a period of 15 minutes.

The viscosity of the bitumen increased as the polymer dispersed in it and the temperature rise which would have resulted from increased energy input by the stirrer was balanced by a reduction in heat input from the hot plate.

After about 2 hours of stirring all the polymer had dispersed into the bitumen as shown by the absence of lumps of polymer adhering to the stirrer and the walls of the beaker.

After the blend had been prepared it was heated to about 205° C. for 1 hour in an open vessel, with gentle agitation with a mechanical stirrer to prevent skinning. The blend was allowed to cool and its properties were then tested.

The penetration at 25° C. was determined in accordance with BS 4691, the softening point was determined in accordance with BS 4692. The ductility recovery (elastic recovery) at 25° C. was determined in accordance with an adaptation of ASTMS D113.

Figure 1:
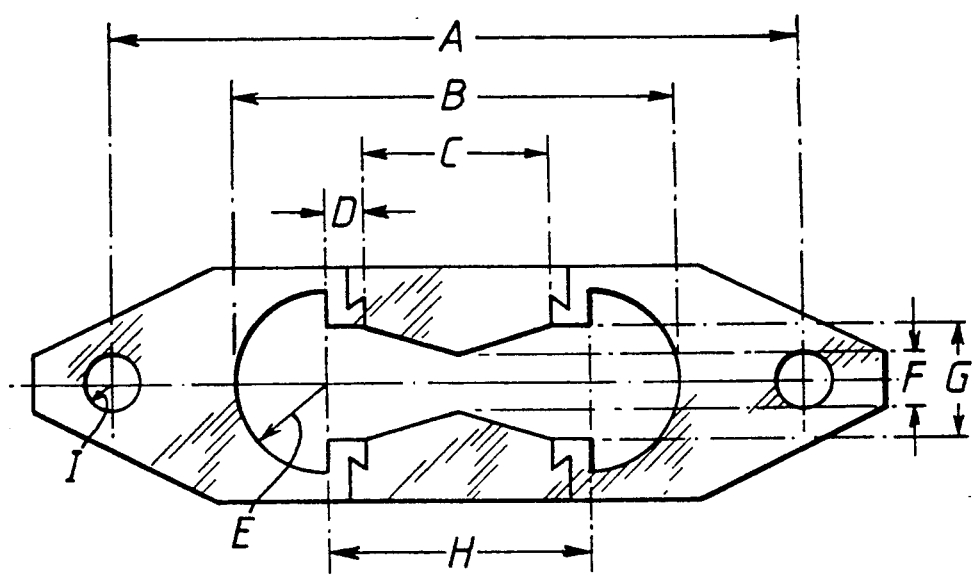
FIG. 1 is a plan view of a mould for producing a test specimen.
Figure 2:
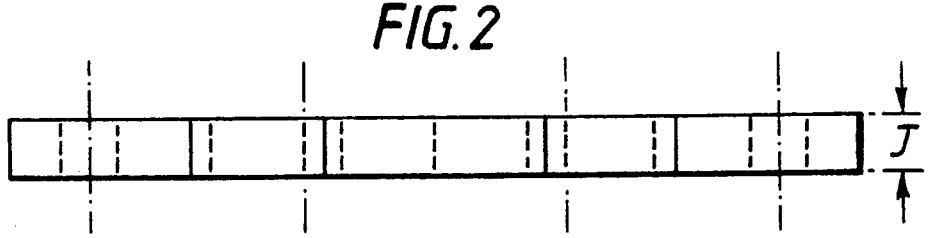
FIG. 2 is an elevation of the mould and by reference to the following experiments in which comparative tests, not according to the invention, are identified by letters and examples of the invention are identified by numbers.

A test specimen was produced from the composition in the mould shown in FIGS. 1 and 2 which when placed on a base plate defined a cavity having hemispherical ends and a narrow waist. Referring to the letters shown on the drawings, A is the distance between the centres of two holes, intended to fit over pegs on the base plate (not shown), and is in the range 11.5 to 113.5 mm. The total length of the cavity, and thus of the moulded test piece (or briquet) is 74.5 to 75.5 mm. The dimension C, which represents the difference between the position if clips is used in the test, is 29.7 to 30.3 mm. The shoulder D has a length of 6.8 to 7.2 mm. The radius E of the hemispherical portions is 15.75 to 16.25 mm, and the width at minimum cross section (F) is 9.1 to 10.1 mm. The width of the mouth of the clip (G) is 19.8 to 20.2 mm. The distance between centres of radii (H) is 42.9 to 43.1 mm. The diameter of the holes for receiving pegs (I) is 9.9 to 10.1 mm, and the thickness (J) is 9.9 to 10 mm.

Where ranges of values are given these represent acceptable tolerances for the production of the mould.

A sample of the molten bitumen/polymer blend was poured into a mould as defined above, and was allowed to cool to room temperature for 30 to 40 minutes. It was then placed in a water bath at 25° C. Excess bitumen was trimmed from the mould to leave it level and full. The sample was replaced in the water bath for a further 85-95 minutes. The mould was then removed from the base plate and the side walls removed to release the bitumen/polymer sample (briquet), which was tested immediately. The hemispherical end pieces were attached to the jaws of a ductilometer and were pulled apart uniformly at the rate of 5 cm/minute for 20 cm. The centre of the briquet was then immediately cut and the thread retraction was measured after 1 hour. The elastic recovery % (ductility recovery) was quoted as $$\frac{\text{retraction (cm)} \times 100}{20}$$

The results are given in Table.

COMPARATIVE TEST A

An experiment was carried out as in Example 1 but with the following difference. The polybutadiene was not a high vinyl polybutadiene but contained 90% by weight of 1,4-polybutadiene with a weight ratio of cis to trans structures of about 1:1. It had a weight average molecular weight of about 200 000 and was commercially available under the trade name "Intene 50".

The blend was tested as in Example 1 and the results are given in the Table.

COMPARATIVE TEST B

An experiment was carried out as in Example 1 but with the following difference. The polybutadiene was not a high vinyl polybutadiene but contained 98% by weight of cis 1,4-polybutadiene. It had a molecular weight of about 200 000 and was commercially available under the trade name "Europrene neo cis". This polymer required a 4 hour blending time.

The blend was tested as in Example 1 and the results are shown in the Table.

EXAMPLE 2

A blend of bitumen and polybutadiene was prepared as in Example 1 that the bitumen used was a bitumen originating from Australia under the designation Kwinana 170 and had a penetration 70 mm/10 as determined in accordance with BS 4691, and a softening point of 46.0 as determined in accordance with BS 1462. It was classified as a class 170 bitumen as indicated by its viscosity.

The results are shown in the Table.

COMPARATIVE TEST C

An experiment was carried out as in Example 2 but with the following differences. The polybutadiene was that used in Comparative Test A ("Intene 50"). After the polymer had been blended into the bitumen after about 4 hours of high shear stirring a peroxide curing agent (dicumyl peroxide) was incorporated into the blend to give 16.7% by weight of curing agent based on the weight of the polymer.

After the blend had been prepared it was heated to about 180° C. for 1 hour in an open vessel with gentle mechanical agitation to cure it. The test results are shown in the Table.

COMPARATIVE TEST D

An experiment was carried out as in Test C except that a different curing agent was used. Instead of peroxide elemental sulphur was added during the preparation of the blend in an amount giving 16.7% by weight of sulphur based on the weight of the polymer. The blend was cured as in Test C. The results are given in the Table.

COMPARATIVE TEST E

An experiment was carried out as in Test C (using a peroxide curing agent) but using a 98% cis 1,4-polybutadiene sold under the trade name "Austrapol 1252". The results are given in the Table.

TABLE

| Experiment | Penetration | Softening Point °C. | Ductility Recovery |
| --- | --- | --- | --- |
| 1 | 49 mm/10 | 55.2 | 73% |
| A | 26 mm/10 | 65.8 | 35% |
| B | 45 mm/10 | 54.8 | 42% |
| 2 | 51 mm/10 | 53.0 | 62% |
| C | 51 mm/10 | 51.0 | 38% |
| D | 42 mm/10 | 52.6 | 45% |
| E | 59 mm/10 | 49.2 | 36% |

A comparison of the results for Example 2 with those for Tests C, D and E shows that the use of an air cured high vinyl polybutadiene gives acceptable results for penetration and softening point when compared with other types of polybutadiene cured with sulphur or peroxide curing agents but gives much better results for ductility recovery.

A comparison of the results for Example 1 with those for Tests A and B shows that the use of the high vinyl polybutadiene gives an acceptable penetration, a somewhat higher softening point, but a greatly enhanced value for ductility recovery when compared with other polybutadienes in air curing systems, i.e. when no curing agents are added to the blend. High ductility recovery is an important characteristic for bitumen blends intended for paving use.

I claim:

1. A paving composition which comprises a blend of:
   (a) bitumen having the following characteristics, namely a penetration in the range 15–450 mm/10, a softening point in the range 30° to 80° C., and a penetration index of −2 to +2 and
   (b) A high vinyl polybutadiene polymer with a content of 1,2-polybutadiene of at least ten 10% by weight, said polymer containing not more than 50% by weight of units derived from a comonomer, and having a weight average molecular weight of at least 100,000, the quantity of polymer being in the range 0.5 to 20% by weight of the total blend, said blend being substantially free from added sulphur or peroxide cross-linking agents, and having an elastic recovery of over 50%.

2. A paving composition according to claim 1 in which the bitumen has a penetration in the range 35–300 mm/10 and a softening point in the range 30°–65° C.

3. A paving composition according to claim 2 wherein the high vinyl polybutadiene has a content of 1,2-polybutadiene of at least 50% by weight.

4. A paving composition according to claim 3 wherein the polybutadiene is solid at 20° C.

5. The process for making a paving bitumen blend which comprises:
   (a) melting bitumen having the following characteristics: a penetration in the range 15–450 mm/10, a softening point in the range 30° to 80° C., and a penetration index of −2 to +2,
   (b) adding to the molten bitumen a quantity of a high vinyl polybutadiene polymer with a content of 1,2-polybutadiene of at least 10% by weight, said polymer containing not more than 50% by weight of units derived from a comonomer, and having a weight average molecular weight of at least 100,000, in an amount in the range 0.5 to 20% based on weight of blend to give a mixture substantially free of added sulphur and peroxide curing agent,
   (c) subjecting the mixture of bitumen and polymer to sufficient agitation at a temperature in the range 160°–180° C. to disperse the polymer in the blend,
   (d) curing the polymer by the steps of agitation the molten mixture in the presence of air at a temperature in excess of 190° C. for a time sufficient to give an elastic recovery of over 50%.

6. A process according to claim 5 in which the bitumen has a penetration in the range 35–300 mm/10 and a softening point in the range 30°–65° C.

7. A process according to claim 6 wherein the high vinyl polybutadiene has a content of 1,2-polybutadiene of at least 50% by weight.

8. A process according to claim 7 wherein the polybutadiene is solid at 20° C.

9. A process according to claim 5 wherein the polymer is added to molten bitumen, the bitumen being at a temperature in the range 160°–180° C.

10. A process according to claim 9 wherein the mixing of the polymer and bitumen is carried out for 1 to 4 hours.

11. A process according to claim 5 wherein the polymer is cured by heating at a temperature in excess of 200° C. and below 220° C.

12. A process according to claim 11 wherein the duration of the curing step is in the range 0.75 to 2 hours.

* * * * *